Figure 1:
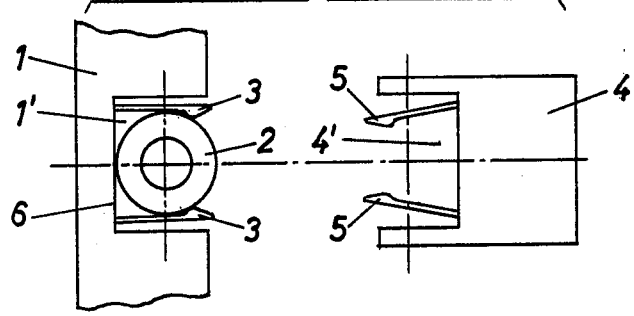

United States Patent [19]

Hollmayer

[11] 4,288,798
[45] Sep. 8, 1981

[54] STYLUS CHANGING DEVICE

[75] Inventor: Walter Hollmayer, Himberg, Austria

[73] Assignee: Goerz Electro Gesellschaft m.b.H., Vienna, Austria

[21] Appl. No.: 81,916

[22] Filed: Oct. 4, 1979

[51] Int. Cl.³ .............................................. G01D 15/00
[52] U.S. Cl. ................................ 346/139 R; 33/18 R
[58] Field of Search ................ 346/139 R, 140 A, 29, 346/46; 33/18 R

[56] References Cited

U.S. PATENT DOCUMENTS

| 841,222 | 1/1907 | Bowman | 346/140 A |
| 2,717,820 | 9/1955 | Bowditch | 346/140 |
| 3,426,353 | 2/1969 | Thorburn | 346/139 R X |
| 3,786,511 | 1/1974 | Bates | 346/49 X |
| 4,135,245 | 1/1979 | Kemplin | 346/139 R |

OTHER PUBLICATIONS

Calcomp; Anaheim, Calif.; Publication on 1012 Drum Plotter, IGT-100,. Jun., 1978.

Primary Examiner—Joseph W. Hartary
Attorney, Agent, or Firm—Fleit & Jacobson

[57] ABSTRACT

A stylus changing apparatus for use in automatically controlled drafting machines utilizing a plurality of styli comprising a fixed magazine defining a plurality of compartments for receiving styli not instantaneously in use and a displaceable carriage for the stylus in use, the carriage also defining a compartment for the stylus, wherein each compartment (1') of the magazine (1) and the chamber (4') of the stylus carriage (4) each include a stylus holding device, the holding devices in the compartments (1', 4') being identical and being formed by the rear wall (6) of the compartment (1', 4') defining a fixed stop for the stylus (2) and by two resilient clips (3, 5) the free ends of which project into the compartment (1, 1') said free ends each having an inwardly directed projection on barb formed thereon, said projections abutting against the stylus (2) located in the compartment (1, 1') and resisting in use, motion of said stylus (2) away from said rear wall (6) whereby transfer of a stylus (2) between the magazine (1) and the carriage (4) is effected by displacing the carriage (4) in directions parallel to its co-ordinate axes.

2 Claims, 4 Drawing Figures

STYLUS CHANGING DEVICE

SUMMARY OF THE INVENTION

According to a feature of the invention a stylus changing apparatus for automatically controlled drafting machines is created, each stylus being carried in a compartment of the magazine or of the carriage, on the one hand by barb formed ends of two resilient clips respectively, and on the other hand by the rear wall of the compartment as stop, to enable the transfer of the stylus from the magazine to the carriage.

The present invention relates to a stylus changing device for automatically controlled drafting machines.

Automatic drafting machines used for producing graphic data are becoming more and more widely used. They are used for graphically depicting, inter alia, plans, circuit diagrams and constructional drawings produced by data processing systems.

To improve the clarity and definition of the graphical representations, it is desirable for them to be in a plurality of different colours or to have varying thicknesses of strokes or lines. For this purpose, it is necessary to ensure that the type or colour of stylus can be changed on a command from a computer controlling the drawing program, whilst the representation is being made.

An automatic drafting machine is known in which a plurality of different styli, together with the stylus in use, are carried on a displaceable stylus carriage. The stylus in use at any particular time is pressed against the paper by means of a solenoid. The stylus carriage, in such an arrangement is thus large and heavy and correspondingly large drive motors therefor are necessary. The motors must then be controlled by correspondingly powerful amplifiers. Due to the enlarged size of the stylus carriage, the range of possible mechanical adjustment must be greater than the width of the paper on which the representation is being made. This leads to a further increase in the dimensions of the machine.

An apparatus is also known in which a single stylus is carried by the stylus carriage. A change of stylus is effected by depositing the unwanted stylus in a fixed magazine and replacing it by the desired stylus. The fixed magazine, in such a case, is divided into (n+1) chambers or compartments, n being the number of different styli. All but one of the chambers or compartments are fitted with retaining members for holding the styli deposited therein and have sensors associated therewith which signal to the computer as to whether a particular chamber is occupied by a stylus or not. The other chamber is only provided with a sensor and has no retaining members. This chamber is used exclusively for determining and/or indicating whether or not the stylus carriage is carrying a stylus. To do this, the stylus carriage must be brought into a position adjacent this chamber. The hardware required for this known stylus changing device thus comprises (n+1) sensors, the same number of input gates for the computer circuit and all the electrical wiring associated therewith. This known apparatus therefore overcomes the disadvantage of increased mass and dimensions of the stylus carriage, but only at the expense of necessitating a complex cycle of movements when it is desired to change the stylus in use.

The present invention seeks to provide a stylus changing device which avoids, or at least minimizes, the above-identified disadvantages.

According to the present invention there is provided a stylus changing apparatus for use in automatically controlled drafting machines utilising a plurality of styli comprising a fixed magazine defining a plurality of compartments for receiving styli not instantaneously in use and a displaceable carriage for the stylus in use, the carriage also defining a compartment for the stylus, wherein each compartment of the magazine and the chamber of the stylus carriage each include a stylus holding device, the holding devices in the compartments being identical and being formed by the rear wall of the compartment defining a fixed stop for the stylus and by two resilient clips, the free ends of which project into the compartment, said free ends each having an inwardly directed projection or barb formed thereon, said projections abutting against a stylus located in the compartment and resisting, in use, motion of said stylus away from said rear wall whereby transfer of a stylus between the magazine and the carriage is effected by displacing the carriage in directions parallel to its co-ordinate axes.

An apparatus in accordance with the invention obviates the need for sensors, and their associated hardware, to signal the fact that the compartments of the magazine and carriage are occupied.

Preferably, the clips in each compartment have a rest or empty position in which said clips are inclined towards one another whereby, in use, movement of the carriage towards the magazine causes the clips in the empty desired compartment in the magazine or carriage to strike against the stylus carried in the or one of the compartments of the carriage or magazine respectively, further movement causing the empty compartment clips to become interposed between the stylus and the clips hitherto retaining it.

Advantageously, means are provided for detecting mechanical obstruction occurring during displacement of the stylus carriage, said detector means monitoring the difference between the nominal and actual values of the local control circuit for driving the stylus carriage so as to produce a signal, the signal being employed to change or as a basis for changing the control program so as to avoid faulty or spurious operation of the device.

Figure 2:
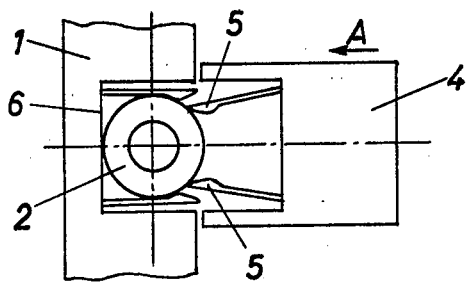
Figure 3:
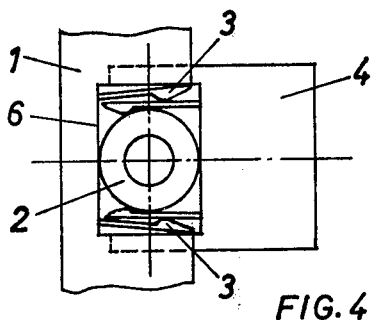
Figure 4:
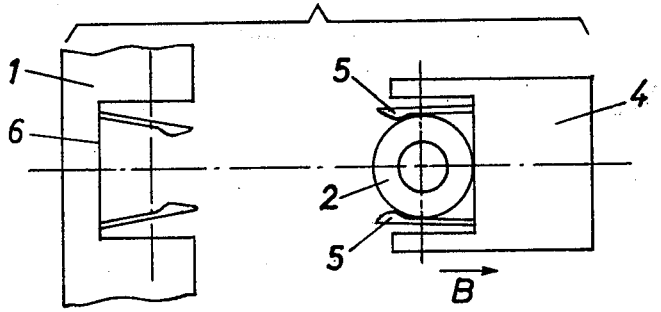

The invention will be further described, by way of example, with reference to the accompanying drawings, in which:

FIG. 1 shows a plan view of the principal integers of a stylus changing apparatus in accordance with the present invention, the stylus being located in a fixed magazine and a stylus carriage being empty and FIGS. 2 to 4 are views similar to FIG. 1 showing the positions of the integers at various stages during the transfer of the stylus from the fixed magazine to the carriage.

In the drawings, there is shown a fixed magazine 1 defining a compartment 1'. In practice, the magazine will define a plurality, for example four, of compartments. However, for the sake of clarity only one is shown in the drawings. A stylus 2 is retained in the compartment 1' of the magazine 1 in the position shown in FIG. 1. Such retention is effected by means of resilient clips 3 which extend from the rear wall 6 of the compartment 1'. In the free end region of each clip, an inwardly directed projection or barb is provided. The back wall 4 acts as a stop for the stylus which is held between the clips 3 and is prevented from movement away from the wall 4 by the barbs. A displaceable carriage 4 is provided for the stylus and defines a compartment 4' therefor. The compartment 4' also has clips 5, identical to the clips 3. As shown in FIG. 1, no stylus is located in the compartment 4'. The clips 3 and 5 in each compartment are inclined slightly toward one another in their rest, that is to say, non-stylus carrying, position for reasons which will be described hereinafter.

As shown in FIG. 2, the displaceable carriage has been displaced towards the magazine 1 in the direction of arrow A. The clips 5 strike against the stylus 2 held in the compartment 1' of the magazine. They then slide over the surface of the stylus until the stylus strikes against the rear wall of the compartment 4' whereupon the stylus is retained by the clips 5, as shown in FIG. 3. In so doing, the clips 3 originally holding the stylus 2 are forced apart. If, as is shown in FIG. 4, the stylus carriage 4 is moved away from the magazine 1 in the direction of arrow B, it can clearly be seen that the stylus 2 is firmly retained in the compartment 4' and the clips 3 of the magazine 1 have moved into their rest position. By reversing this cycle of events, the stylus can be returned from the carriage to the magazine.

It will thus be seen that to effect a change-over of the stylus between the magazine and the stylus carriage can be effected by simply displacing the drafting machine in the directions of the co-ordinate axes thereof. The control program necessary therefor is therefore simplified and the change-over can be effected rapidly.

Since removal or installation of the styli may also be effected manually, it is necessary to ensure that, if the graphical representation is being produced automatically in accordance with a set program, no spurious and undesirable markings are made. It will be assumed that the displacement of the stylus carriage in both of its directions of movement is effected by means of a servo mechanism. The actual position of the stylus carriage, indicated by the position of the slider of a potentiometer connected to the stylus carriage is transformed into a voltage which is continuously compared with a voltage proportional to the nominal value. The difference between the nominal and the actual value is amplified and supplied as a control signal to the motor driving the stylus carriage. If the carriage encounters an obstruction, the output control signal is increased until the torque produced by the motor becomes large enough to overcome the obstruction. Alternatively, if the maximum torque of the motor is insufficient, the output control signal increases the torque produced to its maximum value. This increased output control signal occurring when the displacement of the carriage is obstructed is detected and is signalled to the operator in any suitable manner.

If a stylus is being carried in the stylus carriage and is then to be deposited in a compartment of the magazine, the program may attempt to deposit the stylus in a compartment already occupied by another stylus. To recognize this, the control program is modified so that the stylus carriage is, initially, only moved towards the magazine compartment sufficiently to cause the two styli to contact one another if that magazine compartment already contains a stylus. Such contact forms an obstruction to the carriage displacement which is indicated by an increase in the control signal. Further movement of the carriage is then made dependent upon no such increased control signal occurring.

In a similar manner, a test can be made as to whether the carriage has successfully collected a stylus from the magazine. If the change-over is unsuccessful, a section or sections of the graphical representation may be missing. In order to check whether the stylus carriage is carrying a stylus, the carriage is moved towards a wall of the magazine to such an extent that a stylus carried therein would impact the wall. The control signal thus produced will indicate whether or not a stylus is present. The test as to whether or not a stylus is present could also be effected by means of switches installed in the magazine and on the stylus carriage. The disadvantage of this, however, is that a number of switches are required which may give rise to breakdowns. Moreover, considerable additional wiring is required. The omission of electrical connections for the stylus changing device in accordance with the invention facilitates the fitting of such a device to a known drafting machine, since no electrical modification is necessary. It is merely necessary to alter the control program accordingly.

I claim:

1. A stylus changing apparatus for use in automatically controlled drafting machines utilising a plurality of styli comprising a fixed magazine defining a plurality of compartments for receiving styli not instantaneously in use and a displaceable carriage for the stylus in use, the carriage also defining a compartment for the stylus, wherein each compartment of the magazine and the chamber of the stylus carriage each include a stylus holding device, the holding devices in the compartments being identical and being formed by the rear wall of the compartment defining a fixed stop for the stylus and by two resilient clips, the free ends of which project into the compartment, said free ends each having an inwardly directed projection or barb formed thereon, said projections abutting against a stylus located in the compartment and resisting, in use, motion of said stylus away from said rear wall whereby transfer of a stylus between the magazine and the carriage is effected by displacing the carriage in directions parallel to its co-ordinate axes.

2. A device as claimed in claim 1 wherein the clips in each compartment have a rest or empty position in which said clips are inclined towards one another whereby, in use, movement of the carriage towards the magazine causes the clips in the empty desired compartment in the magazine or carriage to strike against the stylus carried in the or one of the compartments of the carriage or magazine respectively, further movement causing the empty compartment clips to become interposed between the stylus and the clips hitherto retaining it.

* * * * *

UNITED STATES PATENT AND TRADEMARK OFFICE
CERTIFICATE OF CORRECTION

PATENT NO. : 4,288,798
DATED : September 8, 1981
INVENTOR(S) : Walter HOLLMAYER

It is certified that error appears in the above—identified patent and that said Letters Patent is hereby corrected as shown below:

In column 4, delete lines 48 through 58
("2. A device ... hitherto retaining it.")

In column 4, after line 58, add the following claim:

2. A device as claimed in claim 1 wherein the clips in each compartment have a rest or empty position in which said clips are inclined towards one another wherein, in use, movement of the carriage towards the magazine causes the clips in the empty desired compartment in the magazine or carriage to strike against the stylus carried in the compartment of the carriage or one of the compartments of the magazine respectively, further movement causing the empty compartment clips to become interposed between the stylus and the clips hitherto retaining it.

Signed and Sealed this

Twelfth Day of October 1982

[SEAL]

Attest:

GERALD J. MOSSINGHOFF

Attesting Officer    Commissioner of Patents and Trademarks